US005835776A

United States Patent [19]
Tirumalai et al.

[11] Patent Number: 5,835,776
[45] Date of Patent: Nov. 10, 1998

[54] METHOD AND APPARATUS FOR INSTRUCTION SCHEDULING IN AN OPTIMIZING COMPILER FOR MINIMIZING OVERHEAD INSTRUCTIONS

[75] Inventors: Partha P. Tirumalai, Fremont; Krishna Subramanian, Mountain View; Boris Baylin, Palo Alto, all of Calif.

[73] Assignee: Sun Microsystems, Inc., Mountain View, Calif.

[21] Appl. No.: 560,089

[22] Filed: Nov. 17, 1995

[51] Int. Cl.⁶ .................................................. G06F 9/44
[52] U.S. Cl. .................................................. 395/709
[58] Field of Search .............................................. 395/709

[56] References Cited

U.S. PATENT DOCUMENTS

| | | | |
|---|---|---|---|
| 5,265,253 | 11/1993 | Yamada | 395/709 |
| 5,339,238 | 8/1994 | Benson | 395/709 |
| 5,367,651 | 11/1994 | Smith et al. | 395/709 |
| 5,386,562 | 1/1995 | Jain et al. | 395/709 |
| 5,418,958 | 5/1995 | Goebel | 395/709 |
| 5,418,959 | 5/1995 | Smith et al. | 395/709 |
| 5,448,737 | 9/1995 | Burke et al. | 395/709 |
| 5,485,616 | 1/1996 | Burke et al. | 395/709 |
| 5,491,823 | 2/1996 | Ruttenberg | 395/709 |
| 5,606,698 | 2/1997 | Powell | 395/709 |

OTHER PUBLICATIONS

"Register Allocation for Modulo Scheduled Loops: Strategies, Algorithms and Heuristics", by B.R. Rau, M. Lee, P.P. Tirumalai, M.S. Schlansker, Computer Systems Laboratory, HPL–92–48, Apr. 1992, pp. 1–34.

"Parallelizations of WHILE Loops on Pipelined Architectures", by Parthasarathy P. Tirumalai, Meng Lee, and Michael S. Schlansker, Hewlett–Packard Laboratories, The Journal of Supercomputing, 5. (1991), pp. 119–136.

"Code Genreation Schema for Modulo Scheduled Loops", B. Ramakrishna Rau, Michael S. Schlansker, P.P. Tirumalai, Hewlett–Packard Laboratories, 1992, pp. 158–169.

"UltraSparc Unleashes SPARC Performance", Next–Generation Design Could Put Sun Back in Race, by Linley Gwennap, Microprocessor Report, The Insiders Guide to Microprocessor Hardware, Oct. 3, 1994, vol. 8, No. 13, pp. 5–9.

"Partners in Platform Design", To create a successful new high–performance processor, the chip architects and compiler designers must collaborate from the project's very start, Focus Report, by Marc Tremblay and Partha Tirumalai, Sun Microsystems, Inc. IEEE Spectrum, Apr. 1995, pp. 20–26.

"Overlapped Loop Support in the Cydra5", by James C. Dehnert, Apogee Software, Inc., Peter Y.T. Hsu, Sun Microsystems, Inc., and Joseph P. Bratt, Ardent Computer, pp. 26–38, 1989, ACM.

"Parallelization of Loops With Exits On Pipelined Architectures", by P.Tirumalai, M. Lee, M.S. Schlansker, Hewlett–Packard Laboratories, 1990, pp. 200–212.

"The Cydra5 Departmental Supercomputer", Design Philosophies, Decisions, and Trade–offs, by B. Ramakrishna Rau, David W. L. Yen, Wei Yen, and Ross A. Towle, Cydrome, Inc., Computer, Jan. 1989, pp. 12–35.

(List continued on next page.)

Primary Examiner—Kevin A. Kriess
Attorney, Agent, or Firm—Erwin J. Basinski

[57] ABSTRACT

Apparatus and methods are disclosed for scheduling target program instructions during the code optimization pass of an optimizing compiler. Most modern microprocessors have the ability to issue multiple instructions in one clock cycle and/or possess multiple pipelined functional units. They also have the ability to add two values to form the address within memory load and store instructions. In such microprocessors this invention can, where applicable, accelerate the execution of modulo-scheduled loops. The invention consists of a technique to achieve this speed up by systematically reducing the number of certain overhead instructions in modulo scheduled loops. The technique involves identifying reducible overhead instructions, scheduling the balance of the instructions with normal modulo scheduling procedures and then judiciously inserting no more than three copies of the reducible instructions into the schedule.

19 Claims, 11 Drawing Sheets

OTHER PUBLICATIONS

"Sentinel Scheduling for VLIW and Superscalar Processors", by Scott A. Mahike, William Y. Chen, Wen–mei W. Hwu, B. Ramakrishna Rau, and Michael S. Schlansker, Hewlett–Packard Laboratories, Center for Reliable and High–Performance Computing, Universityof Ill., 1992, pp. 238–247.

"Conversion of Control Dependence to Data Dependence", by J.R. Allen, Ken Kennedy, Carrie Porterfield & Joe Warren, Depart. of Mathematical Sciences, Rice University, IBM Corporation, 1983, pp. 177–189.

"Register Allocation for Software Pipelined Loops", by B. R. Rau, M. Lee, P.P. Tirumalai, & M.S. Schlansker, Hewlett–Packard Laboratories, SIGPLAN 1992, pp. 283–299.

"Some Scheduling Techniques and An Easily Schedulable Horizontal Architecture for High Performance Scientific Computing", by B.R. Rau, and C.D. Glaeser, Advanced Processor Technology Group, ESL, Inc., Oct. 1981, pp. 183–198.

"Software Pipelining: An Effective Scheduling Technique for VLIW Machine", by Monica Lam, Depart. of Computer Science, Carnegie Mellon University, Proceedings of the SIGPLAN '88 Conference on Programming Language Design and Implementation, Jun. 22–24, 1988, pp. 318–328.

"Counterflow Pipeline Processor Architecture", Robert F. Sproull, Ivan E. Sutherland, and Charles E. Molnar, Sun Microsystems Laboratories, Inc., Apr. 1994, pp. 1–21.

"Compiler Design In C", by Allen I. Holub, Prentice Hall Software Series, 1990, pp. 673–679.

Execution of a four-stage seven iteration pipeline.

METHOD AND APPARATUS FOR INSTRUCTION SCHEDULING IN AN OPTIMIZING COMPILER FOR MINIMIZING OVERHEAD INSTRUCTIONS

BACKGROUND OF THE INVENTION

1. Field of the Invention

This invention relates to the field of Optimizing Compilers for computer systems. More specifically, the invention is an improved method and apparatus for scheduling target program instructions during the code optimization pass of an optimizing compiler.

2. Background

It is desirable that computer programs be as efficient as possible in their execution time and memory usage. This need has spawned the development of computer architectures capable of executing target program instructions in parallel. A recent trend in processor design is to build processors with increasing instruction issue capability and many functional units. Some examples of such designs are Sun's UltraSparc™ (4 issue), IBM's PowerPC™ series (2–4 issue), MIPS' R10000™ (5 issue) and Intel's Pentium-Pro™ (aka P6) (3 issue). (These processor names are the trademarks respectively of Sun Microsystems, Inc., IBM Corporation, MIPS Technologies, Inc., and Intel Corporation). At the same time the push toward higher clock frequencies has resulted in deeper pipelines and longer instruction latencies. These and other computer processor architectures contain multiple functional units such as I/O memory ports, integer adders, floating point adders, multipliers, etc. which permit multiple operations to be executed in the same machine cycle. The process of optimizing the target program's execution speed becomes one of scheduling the execution of the target program instructions to take advantage of these multiple computing resource units or processing pipelines. This task of scheduling these instructions is performed as one function of an optimizing compiler. Optimizing compilers typically contain a Code Optimization section which sits between a compiler front end and a compiler back end. The Code Optimization section takes as input the "intermediate code" output by the compiler front end, and operates on this code to perform various transformations to it which will result in a faster and more efficient target program. The transformed code is passed to the compiler back end which then converts the code to a binary version for the particular machine involved (i.e. SPARC, X86, IBM, etc). The Code Optimization section itself needs to be as fast and memory efficient as it possibly can be and needs some indication of the computer resource units available and pipelining capability of the computer platform for which the target program code is written.

For example, most code optimization sections attempt to optimize scheduling of the target program instructions with respect to the number and kind of computing resources available on a particular target hardware platform. Such computing resources include but are not limited to; the number of integer adders, floating point adders, the number of the available CPU registers, the extent of the CPU instruction pipeline and the number and kind of instruction caches available in the target computer. This instruction scheduling is done in an attempt to; minimize the execution delays caused by latency on necessary input data (i.e. by instructions having to wait on necessary data to be made available from previous instructions); to reduce the number of instructions required for a specific calculation to the extent possible; and to schedule instruction execution so as to reduce the contention for available CPU registers (thereby reducing what is known as "register spilling" in subsequent sections of the code optimization processing). This instruction scheduling process focuses on basic blocks in the target program code which could involve operating on hundreds of instructions in the average target program being compiled and could involve 10 to 20 thousand variables in scientific target programs. These basic blocks typically containing any number of loops, each of which typically contains 10–15 instructions with 40–50 variables involved. A basic block is a sequence of consecutive statements in which flow of control enters at the beginning of the block and leaves at the end of the block without halt or the possibility of branching except at the end.

In the past, attempts have been made to develop optimizing compilers generally, and code optimizer modules specifically which themselves run as efficiently as possible. A general discussion of optimizing compilers and the related techniques used can be found in the text book "Compilers: Principles, Techniques and Tools" by Alfred V. Aho, Ravi Sethi and Jeffrey D. Ullman, Addison-Wesley Publishing Co 1988, ISBN 0-201-10088-6, especially chapters 9 & 10 pages 513–723. One such attempt at optimizing the scheduling of instructions in inner-loops in computer platforms with one or more pipelined functional units is a technique called "modulo scheduling." Modulo scheduling is known in the art and is generally described in the paper titled "Some Scheduling Techniques and An Easily Schedulable Horizontal Architecture for High Performance Scientific Computing" by B. R. Rau and C. D. Glaeser, Proceedings of the Fourteenth Annual Workshop on Microprogramming, Advanced Processor Technology Group, ESL, Inc., October 1981, pages 183–198, which is incorporated fully herein by reference. Modulo scheduling is one form of software pipelining that extracts instruction level parallelism from inner loops by overlapping the execution of successive iterations. A brief summary of modulo scheduling is given in the detailed description below.

There are many important problems that have to be overcome when modulo scheduling is used to target modern micro-processors and effectively compile a wide variety of programs. For example, scheduling techniques as described in the prior art do not attempt to systematically amortize or reduce "loop overhead" instructions. (Loop overhead instructions are instructions which the compiler must insert in the executable code to load and store intermediate counter values, to increment or decrement certain counters or array addresses, etc.) Such prior art techniques generally rely on architectures such as Very Long Instruction Word (VLIW) architectures, that provide the ability to issue a large number of instructions in one clock cycle and thereby make such amortization unnecessary. Moreover, some machines such as the Cydra 5 do not possess the ability to add two values to form the address used within memory load and store instructions, a feature which is required for effective reduction of address computations. Most modern microprocessors, on the other hand, do provide such a feature. To keep the instruction fetch bandwidth requirement low, these processors also limit the number of instructions that can be issued together in one clock cycle. Therefore, on these processors, if the number of loop-overhead instructions is reduced, then a higher number of useful instructions can be issued in the same time to perform the desired computation faster. The invention described herein does this systematically for modulo scheduling loops, effectively improving machine utilization.

The present invention uses an elegant method to reduce the number of loop overhead instructions needed in the executable code for a loop in a target program. This invention is contained in the scheduling section of an optimizing compiler which uses modulo scheduling techniques thereby improving the execution speed of the executable code on a target computer platform.

SUMMARY OF THE INVENTION

The present invention overcomes the disadvantages of the above described systems by providing an economical, high performance, adaptable system and method for reducing the execution time of target programs by reducing the number of executable instructions that are required for the target program. The present invention provides an apparatus and method for identifying target program loop instructions which are reducible and using only a reduced number of copies of those instructions in the executable code.

In one aspect of the invention, the instructions are first separated into two classes; those which are reducible and those which are not. Then the non-reducible instructions are modulo scheduled as before. After this scheduling step, the reducible instructions are judiciously inserted at most once in each of the three sections of the Prologue/Kerne/Epilogue sections of the schedule. These insertions of copies are only made in each section if there are other instructions in that section which needed a value from the copy. Then in each section, each non-reducible instruction which uses the value produced by the copied reducible instruction is adjusted so as to operate properly.

In another aspect of the invention, a computer system is disclosed which has a central processing unit (CPU) and random access memory (RAM) coupled to said CPU, for use in compiling a target program to run on a target computer architecture having at least one parallel computation unit which facilitates instruction pipelining and which provides an ability to add at least one value to form an address used in a memory load or store instruction and which permits two or more instructions to be issued in a single clock cycle, the computer system having an optimizing compiler capable of modulo scheduling instructions for a target program, wherein the code optimizer part of the compiler can partition instructions for the target program into reducible instructions and non-reducible instructions, and wherein the modulo scheduler part of the compiler can schedule the non-reducible instructions, and wherein the reducible instructions can be inserted directly into the schedule of the non-reducible instructions and wherein any non-reducible instructions in the schedule which require use of the reducible instructions have their original offset values adjusted as a function of their position in the schedule and their location in the schedule relative to the reducible instruction whose use they require.

In yet another aspect of the invention, a method for performing the code minimization is disclosed. And in still a further aspect of the invention a computer program product, embedded in a computer readable memory configured to perform the code optimization steps is disclosed.

DESCRIPTION OF THE DRAWINGS

The objects, features and advantages of the system of the present invention will be apparent from the following description in which.

NOTATIONS AND NOMENCLATURE

Figure 1:
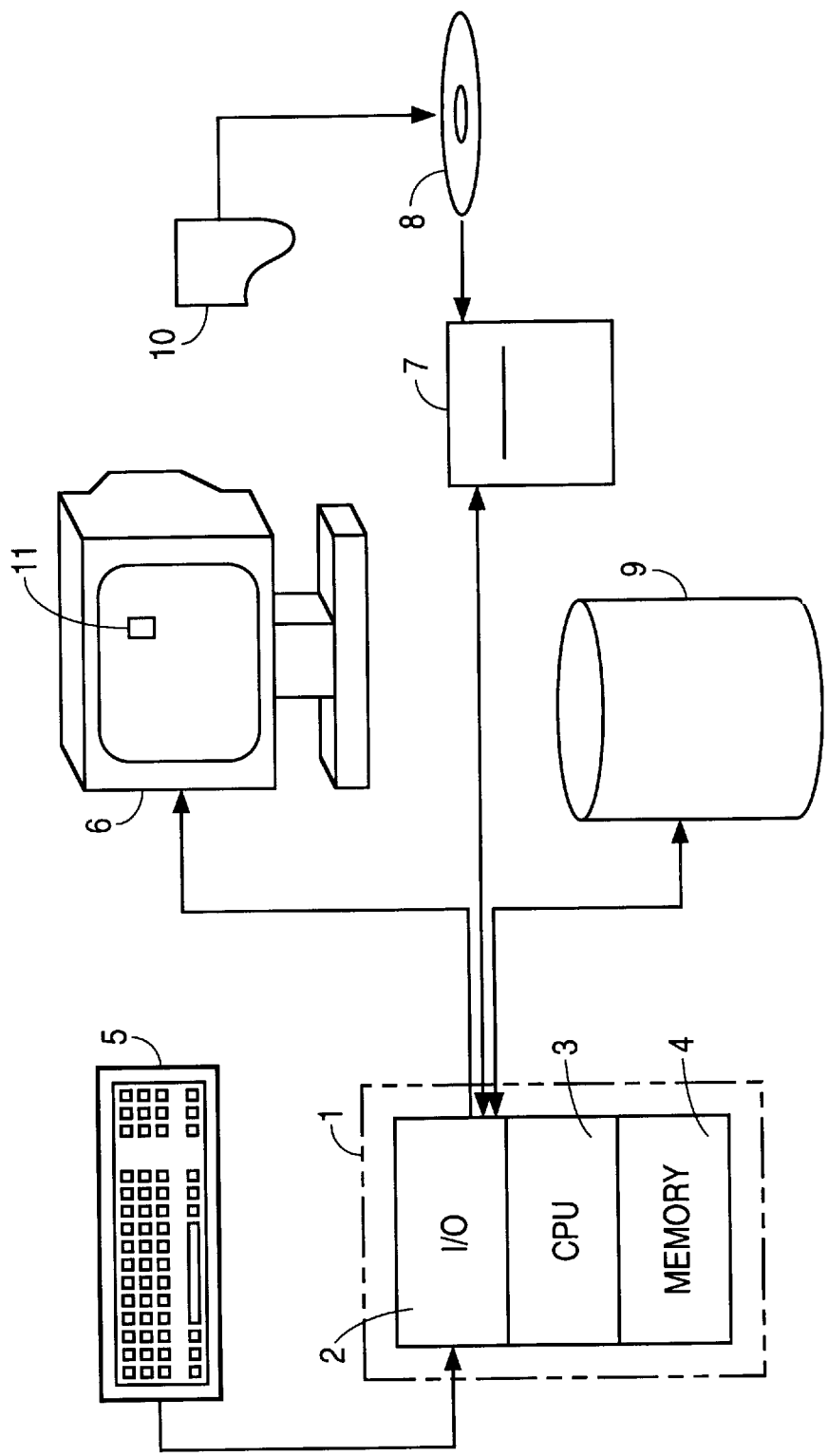
FIG. 1 illustrates a portion of a computer, including a CPU and conventional memory in which the presentation may be embodied.

The detailed descriptions which follow are presented largely in terms of procedures and symbolic representations of operations on data bits within a computer memory. These procedural descriptions and representations are the means used by those skilled in the data processing arts to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be understood, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices. In all cases there should be understood the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Apparatus and methods are disclosed for scheduling target program instructions during the code optimization pass of an optimizing compiler. Most modern microprocessors have the ability to issue multiple instructions in one clock cycle and/or possess multiple pipelined functional units. They also have the ability to add two values to form the address within memory load and store instructions. In such microprocessors this invention can, where applicable, accelerate the execution of modulo-scheduled loops. The invention consists of a technique to achieve this speed up by systematically scheduling certain overhead instructions in modulo scheduled loops. The disclosed invention reduces the number of loop overhead instructions needed in the instruction schedule for processing a loop in the target program on a computer platform that permits instruction pipelining. In the following description, for purposes of explanation, specific instruction calls, modules, etc., are set forth in order to provide a thorough understanding of the present invention. However, it will be apparent to one skilled in the art that the present invention may be practiced without these specific details. In other instances, well known circuits and devices are shown in block diagram form in order not to obscure the present invention unnecessarily. Similarly, in the preferred embodiment, use is made of uni-processor and multi-processor computer systems as well as the SOLARIS operating system, including specifically the SUN ULTRASPARC processor and the SUN SPARC compiler version 4.0, all of which are made and sold by Sun Microsystems, Inc. the assignee of this present invention. However the present invention may be practiced on other computer hardware systems and using other operating systems.

Operating Environment

The environment in which the present invention is used encompasses the general distributed computing system, wherein general purpose computers, workstations, or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an Input/output ("I/O") section 2, a central processing unit ("CPU") 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data.

Figure 2:
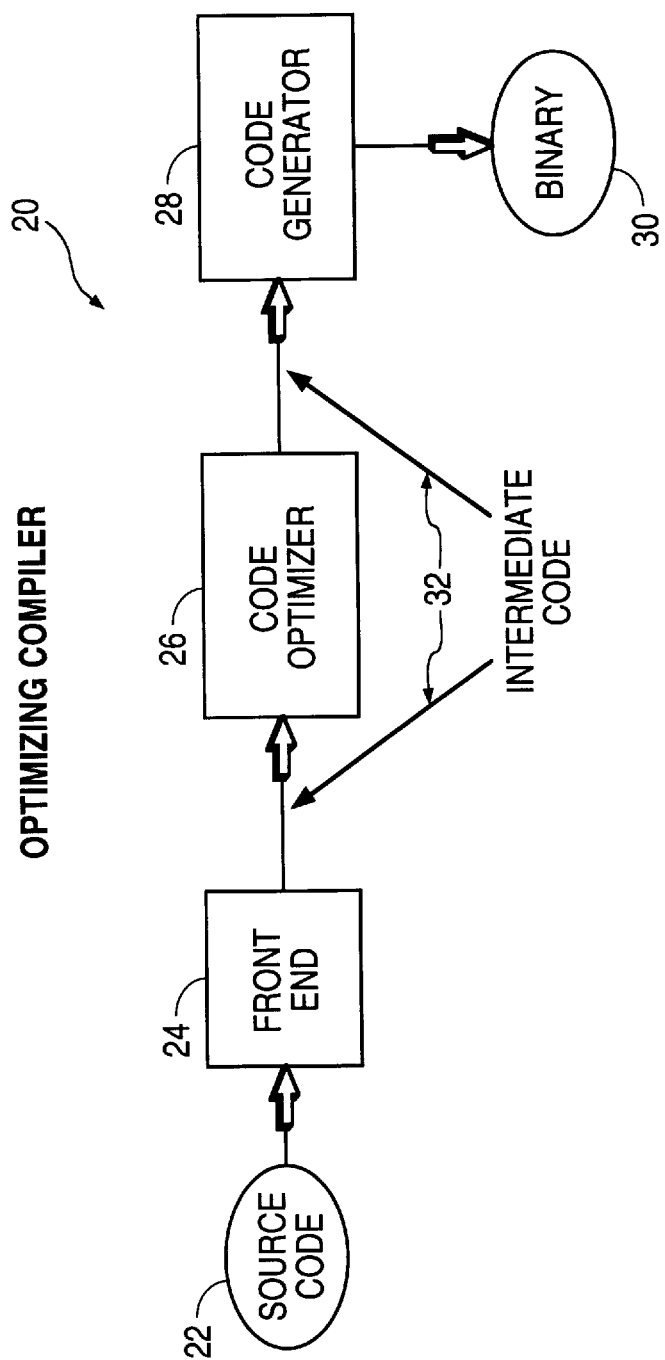
FIG. 2 illustrates a typical compiler showing the position of the code optimizer.

FIG. 2 illustrates a typical optimizing compiler 20, comprising a front end compiler 24, a code optimizer 26 and a back end code generator 28. The front end 24 of a compiler takes as input a program written in a source language 22 and performs various lexical, syntactical and semantic analysis on this language outputting an intermediate set of code 32 representing the target program. This intermediate code 32 is used as input to the code optimizer 26 which attempts to improve the intermediate code so that faster-running machine (binary) code 30 will result. Some code optimizers 26 are trivial and others do a variety of computations in an attempt to produce the most efficient target program possible. Those of the latter type are called "optimizing compilers" and include such code transformations as common sub-expression eliminination, dead-code elimination, renaming of temporary variables and interchange of two independent adjacent statements as well as register allocation.

Figure 3:
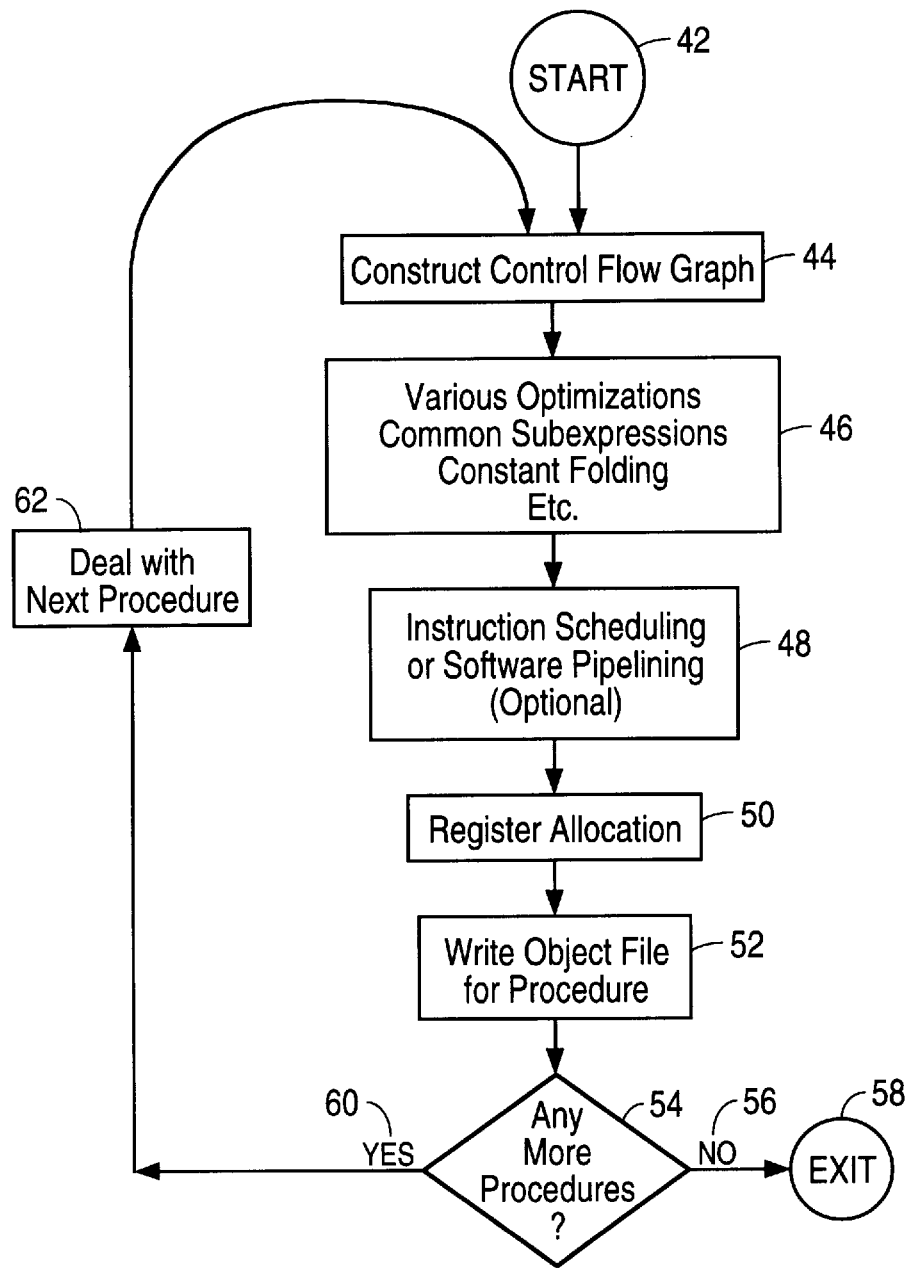
FIG. 3 illustrates a large scale organization of a code optimizer.

FIG. 3 depicts a typical organization of an optimizing compiler 40. On entry of the intermediate code 42 a Control Flow Graph is constructed 44. At this stage the aforementioned code transformations (common sub-expression elimination, dead-code elimination, renaming of temporary variables and interchange of two independent adjacent statements, etc.) take place 46. Next instruction scheduling or "pipelining" may take place 48 at this point. Then "register allocation" is performed 50 and the modified code is written out 52 for the compiler back end to convert it to the binary language of the target machine (i.e. SPARC, X86, etc). It is this "Instruction Scheduling" 48 process which is the focus of the applicants' invention.

Instruction Scheduling

Figure 4:
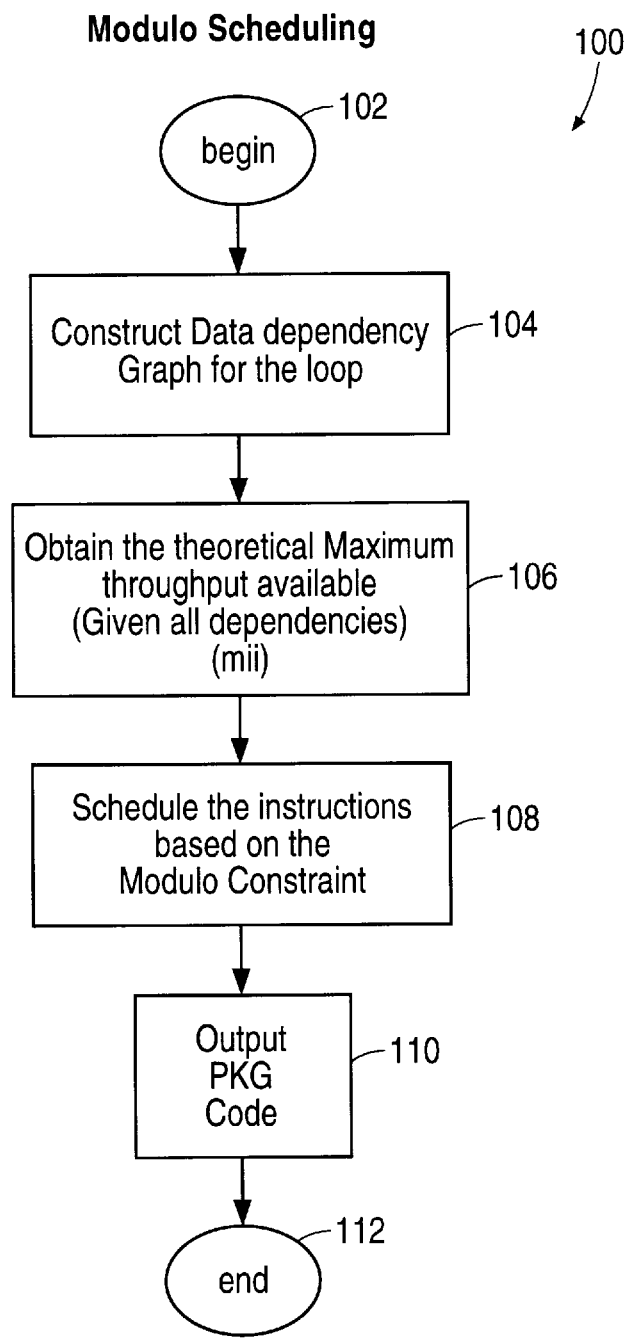
FIG. 4 illustrates an organization of the Instruction Scheduling portion of FIG. 3 as typical in the Prior Art use of modulo scheduling.

Referring now to FIG. 4, a general flow chart of the prior art Optimizing Compiler Modulo Scheduling operation is depicted 100. Upon entry to this section of the Optimizing Compiler 102 incoming intermediate data is processed and the data representing a loop is used to construct a Data Dependency Graph (DDG) 104. Using this DDG the scheduler determines a theoretical maximum throughput possible for this loop, given all the data dependencies and the resource requirements 106. That is, considering the data dependencies of each instruction and the resource requirements (such as a memory port, integer add unit, floating point unit, etc.) a calculation is made to determine the minimum iteration interval (mii). Next all instructions in the loop are scheduled obeying the modulo constraint 108. The output of the scheduling pass 108 is a schedule in PKE format 110, and the scheduling process for the loop is completed 112.

Brief Summary of Modulo Scheduling

Figure 5:
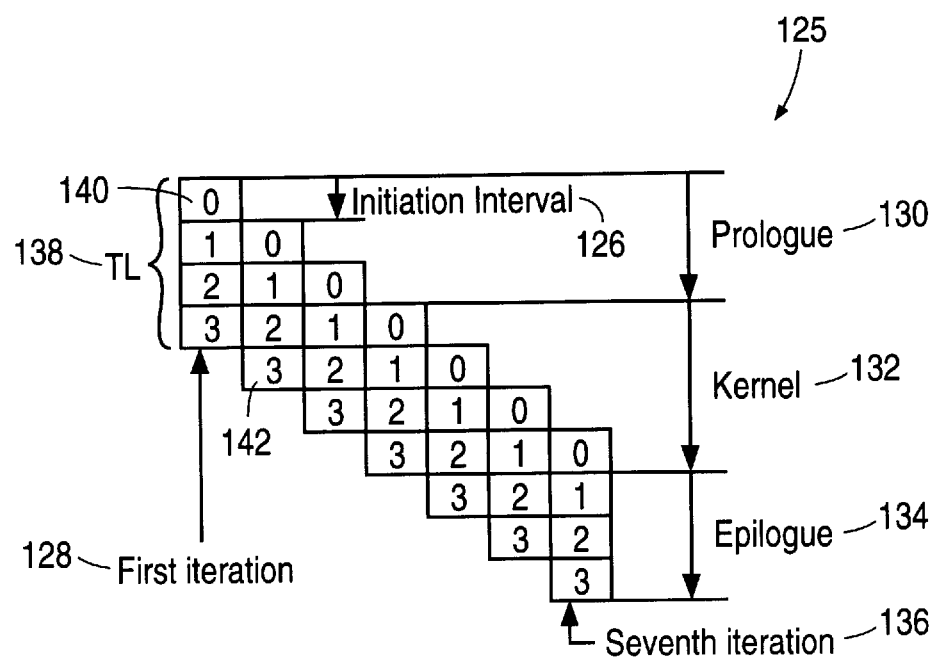
FIG. 5 illustrates a four stage seven iteration pipeline.

Modulo scheduling has been described in the literature as indicated above. Nevertheless it is helpful at this point to summarize the process for completeness. The key principles are as follows. Parallel instruction processing is obtained by starting an iteration before the previous iteration has completed. The basic idea is to initiate new iterations after fixed time intervals. This time interval is called the initiation interval or the iteration interval (II). FIG. 5 shows the execution of seven iterations of a pipelined loop. Let the scheduled length of a single iteration be TL 138 and let it be divided into stages each of length II 126. The stage count, SC is defined as, SC=[TL/II], or in this case TL=4 (138 in FIG. 5) and II=1 126 and so SC=[4/1]=4. Loop execution begins with stage 0 140 of the first iteration 128. During the first II cycles, no other iteration executes concurrently. After the first II cycles, the first iteration 128 enters stage 1 and the second iteration 142 enters stage 0.

New iterations join every II cycles until a state is reached when all stages of different iterations are executing. Toward the end of loop execution no new iterations are initiated and those that are in various stages of progress gradually complete.

These three phases of loop execution are termed the prologue 130, the kernel 132 and the epilogue 134. During the prologue 130 and the epilogue 134 not all stages of successive iterations execute. This happens only during the kernel phase 132. The prologue 130 and the epilogue 134 last for (SC−1)*II cycles. If the trip count of the loop is large (that is, if the loop is of the type where say 10 iterations of the loop are required), the kernel phase 132 will last much longer than the prologue 130 or the epilogue 134. The primary performance metric for a modulo scheduled loop is the initiation interval, II 126. It is a measure of the steady state throughput for loop iterations. Smaller II values imply higher throughput. Therefore, the scheduler attempts to derive a schedule that minimizes the II. The time to execute n iterations is, $T(n)=(n+SC-1)\times II$. The throughput approaches II as n approaches infinity.

Scheduling proceeds as follows. The data dependence graph (DDG) for the loop is constructed. Nodes in this (directed) graph correspond to instructions, and arcs to dependences between them. Arcs possess two attributes: latency and omega. Latency is the number of clocks of separation required between the source and the destination, and omega is the iteration distance between the two. (That is, if the source instruction calculates a value for the destination instruction which is to be used in the next iteration, the omega value would be 1. If the value were to be used two iterations after it was calculated omega would be 2, etc.). Prior to scheduling, two bounds on the maximum throughput, the MII and the RMII, are derived. The MII is a bound on the minimum number of cycles needed to complete one iteration and is based only on processor resources. For example, if a loop has 10 add operations and the processor can execute at most two adds per clock, then the add unit resource would limit the iteration throughput to at most one every five clocks. The MII is computed by taking each resource in turn and then taking the maximum of the bounds imposed by each. The RMII is a bound based on the minimum number of clocks needed to complete one iteration and is based only on dependences between nodes. Cycles in the DDG imply that a value Xj computed in some iteration i is used in a future iteration j and is needed to compute the similarly propagated value in iteration j. These circular dependences place a limit on how rapidly iterations can execute because computing the values needed in the cycle takes time. For each elementary cycle in the DDG, the ratio of the sum of the latencies (l) to the sum of the omegas (d) is computed. This value limits the iteration throughput because it takes l clocks to compute values in a cycle that spans d iterations.

The fixed spacing between overlapped iterations forces a constraint on the scheduler other than the normal constraints imposed by the arcs in the DDG. Note that placing an operation at a time t implies that there exists a corresponding operation in the kth future iteration at (t+k*II). Operations using the same resource must be placed at different times, modulo the II. This is referred to as the "modulo constraint". It states that if an operation uses a resource at time $t_1$ and another operation uses exactly the same resource at time $t_2$, then $t_1$ and $t_2$ must satisfy "$t_1$modulo II is not equal to $t_2$modulo II". The scheduler begins by attempting to derive a schedule using II=max(MII, RMII). If a schedule is not found, the II is incremented. The process repeats until a schedule is found or an upper limit is reached. After scheduling, the kernel has to be unrolled and definitions renamed to prevent values from successive iterations from overwriting each other. "Unrolling the kernel" is defined as creating multiple copies of the kernel in the generated code. The minimum kernel unroll factor (KUF) needed is determined by the longest value lifetime divided by the II because corresponding new lifetimes begin every II clocks. (The "lifetime" of a value is equal to the time for which a value exists; i.e. from the time its generation is started until the last time instant when it is or could be used.). Remainder iterations (up to KUF−1) use a cleanup loop.

The Invention—Modified Modulo Scheduling

Figure 6:
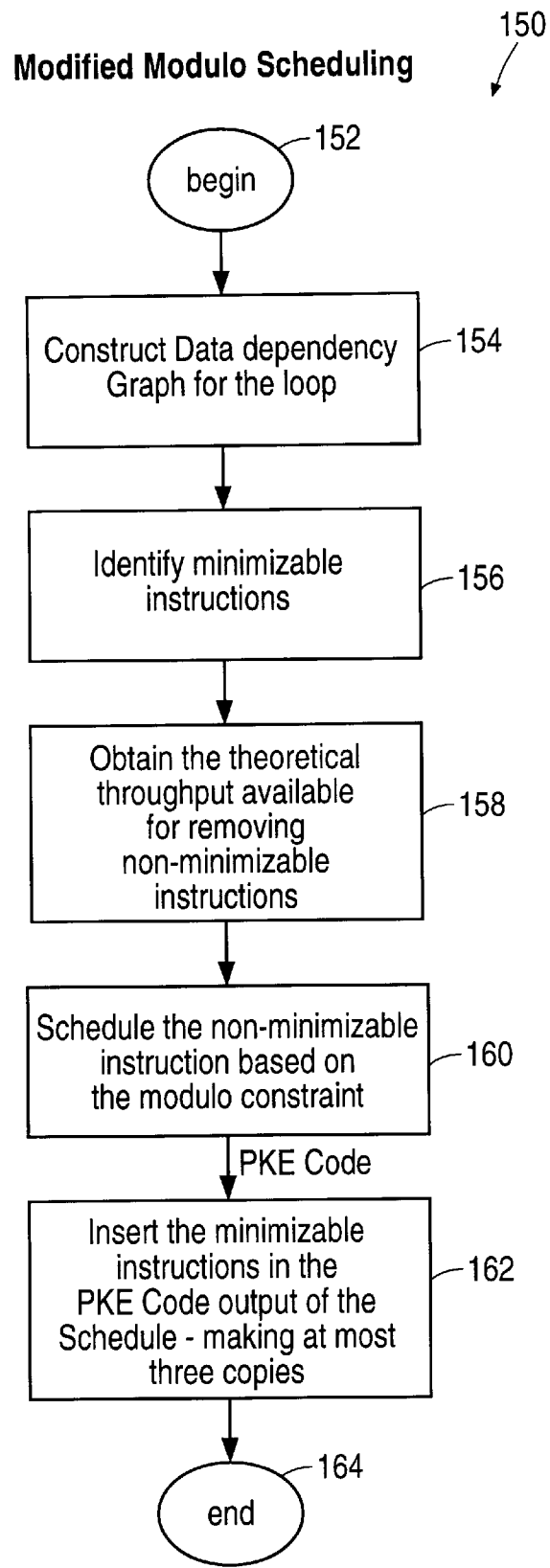
FIG. 6 illustrates a flow chart of a revised modulo scheduling system wherein reducible instructions are identified and scheduled separately.

The basic idea of the invention is shown in FIG. 6. As before, on entry 152, a DDG is constructed for the next loop to be scheduled 154. Then the set of instructions in the input DDG is partitioned into two, wherein the reducible (loop-overhead) instructions are identified 156. One part of the partition contains the non-reducible instructions and the other part contains the reducible instructions. The former is modulo scheduled 158, 160 and then, after a schedule has been derived, the reducible instructions are introduced into the previously derived schedule 162. The key difference from previous approaches is that the two parts are not modulo scheduled together. By recognizing and eliminating the reducible instructions from first class consideration, attention can be devoted exclusively to the more useful non-reducible instructions. However, reducible instructions are necessary and allowance has to be made to reintroduce them into the schedule later. The invention permits this by judiciously adjusting certain parameters when the non-reducible instructions are scheduled. Some important steps are required for this mechanism to work. These are described in detail below.

Identifying Reducible Instructions

A loop instruction is reducible if multiple iterations (more than one) of the loop can be executed without having to execute the reducible instruction in every iteration. In general, an instruction is reducible if a mechanism can be found whereby instructions that use it's result can be modified such that the modified versions do not require the previous reducible instruction to be executed. That is, an instruction, $y=f(x1, x2, \ldots)$ which feeds another instruction $z=g(y, u1, u2, \ldots)$ is reducible if the latter instruction can be modified or rewritten to directly compute $z=g'(x1, x2, \ldots u1\ u2, \ldots)$. In this case y may be said to be reducible in the first degree with respect to z. Similarly, higher degrees of reducibility could be defined. The minimum of the degree of reducibility of an instruction with respect to all its uses is the limiting factor in determining the reducibility of an instruction. In the preferred embodiment it is assumed that reducible means reducible to an unbounded degree (unbounded with the limits of the computer representation of data which is in reality finite) with respect to all uses.

In the preferred embodiment of the present invention, the Sun Microsystems, inc. SC 4.0 compiler developed for the UltraSparc processor currently uses the following criteria for identifying and tagging reducible instructions:

If the instruction is an integral self-increment or self-decrement of an induction variable, and If the induction variable is incremented or decremented by a compile-time known integer constant, and If all uses of the instruction can be modified to have an immediate displacement representing the computed result of the reducible instruction, (Note that for the UltraSparc instruction set the address portion of memory operations allow for an immediate displacement), OR, if the instruction is the loop exit test or the loop back branch, then, the instruction is tagged as a reducible instruction.

Examples of reducible instructions identified by the SC 4.0 compiler include array address increments that feed memory operations (loads and stores), the loop control increment instruction, the loop exit test instruction and the loop back branch.

Figure 7:
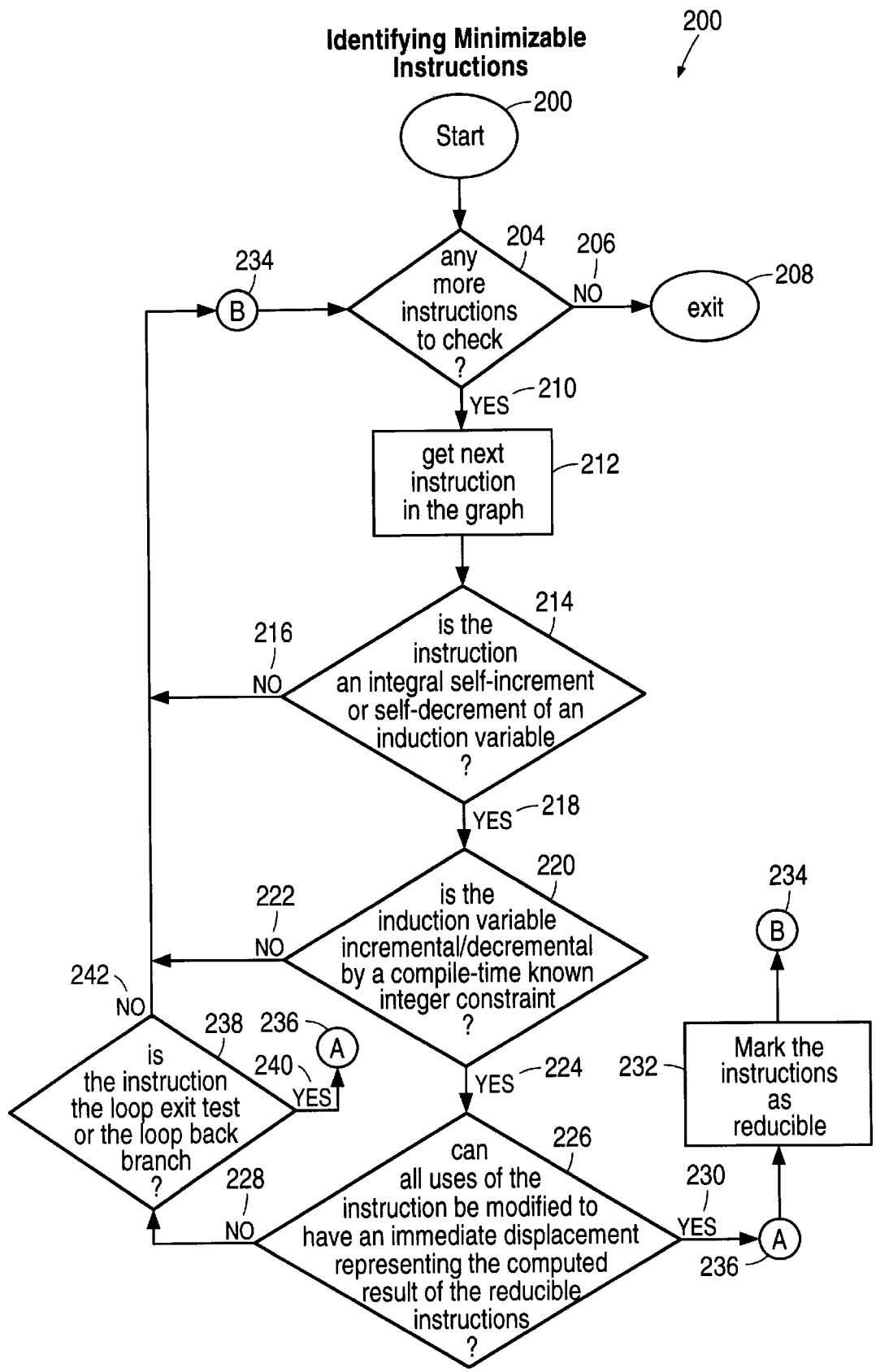
FIG. 7 illustrates in more detail a process for identifying reducible instructions in a loop in the target program.
Figure 8:
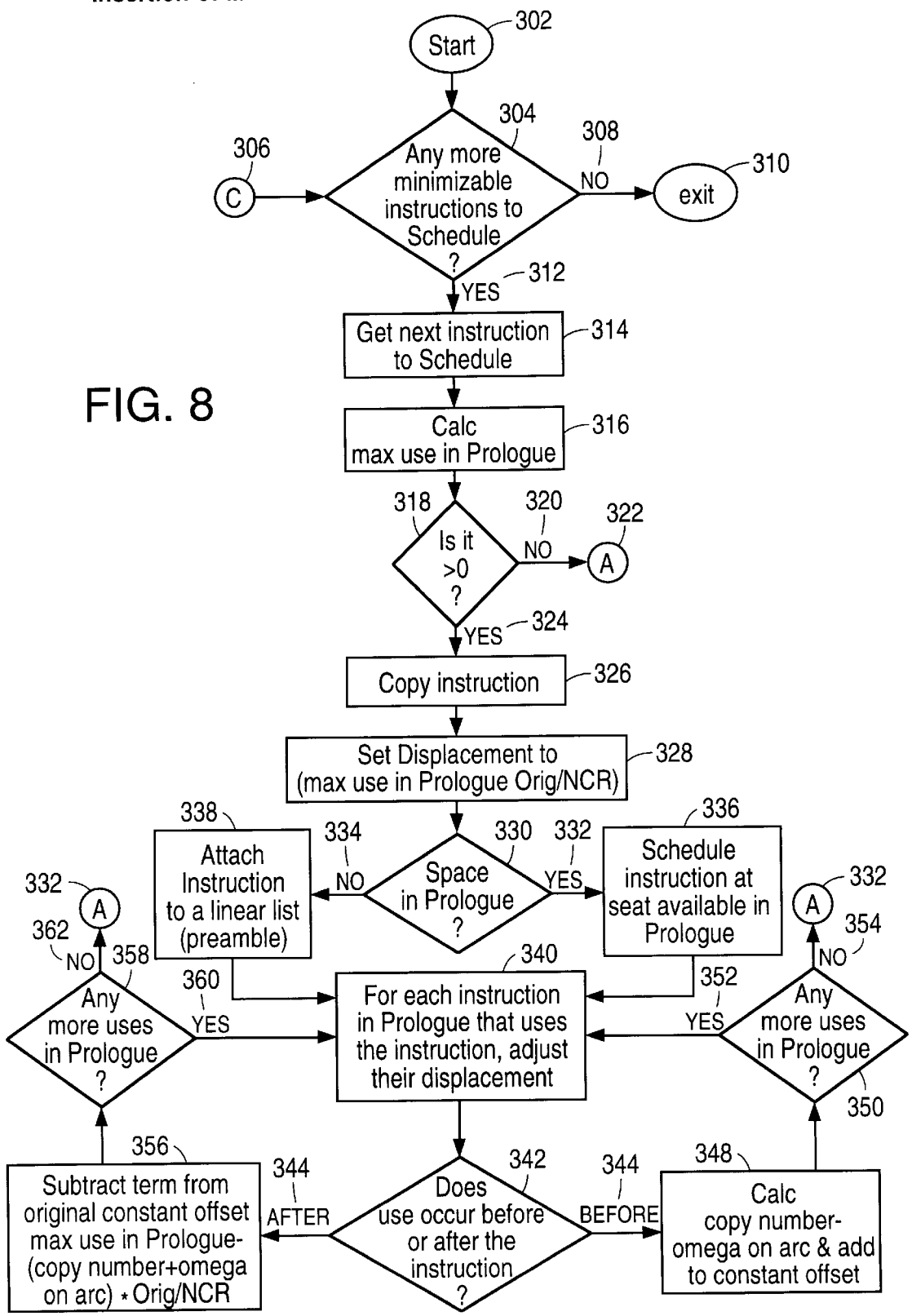
FIGS. 8–10 illustrate in more detail a process for insertion of identified reducible instructions in scheduled PKE code.
Figure 9:
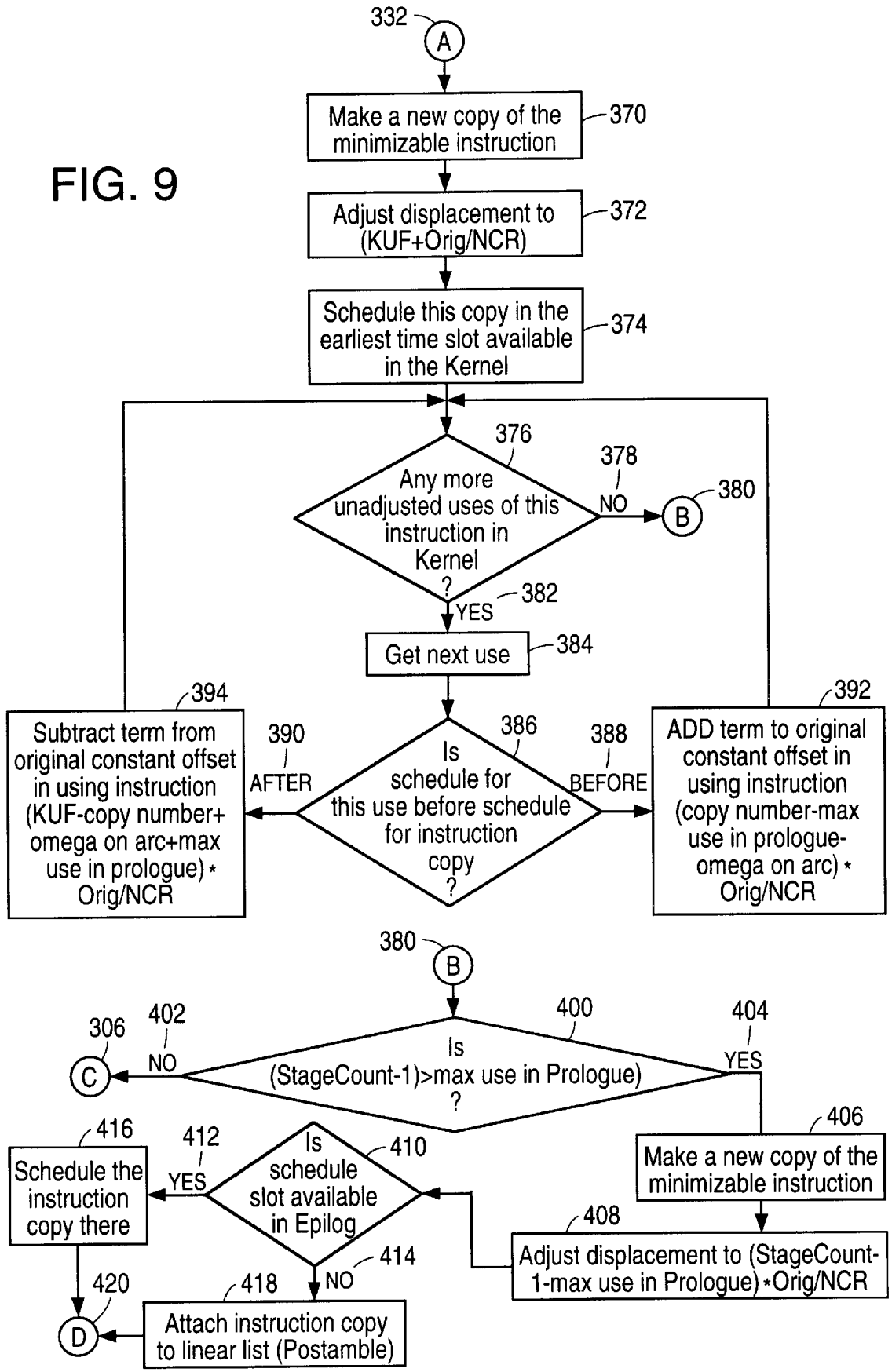
Figure 10:
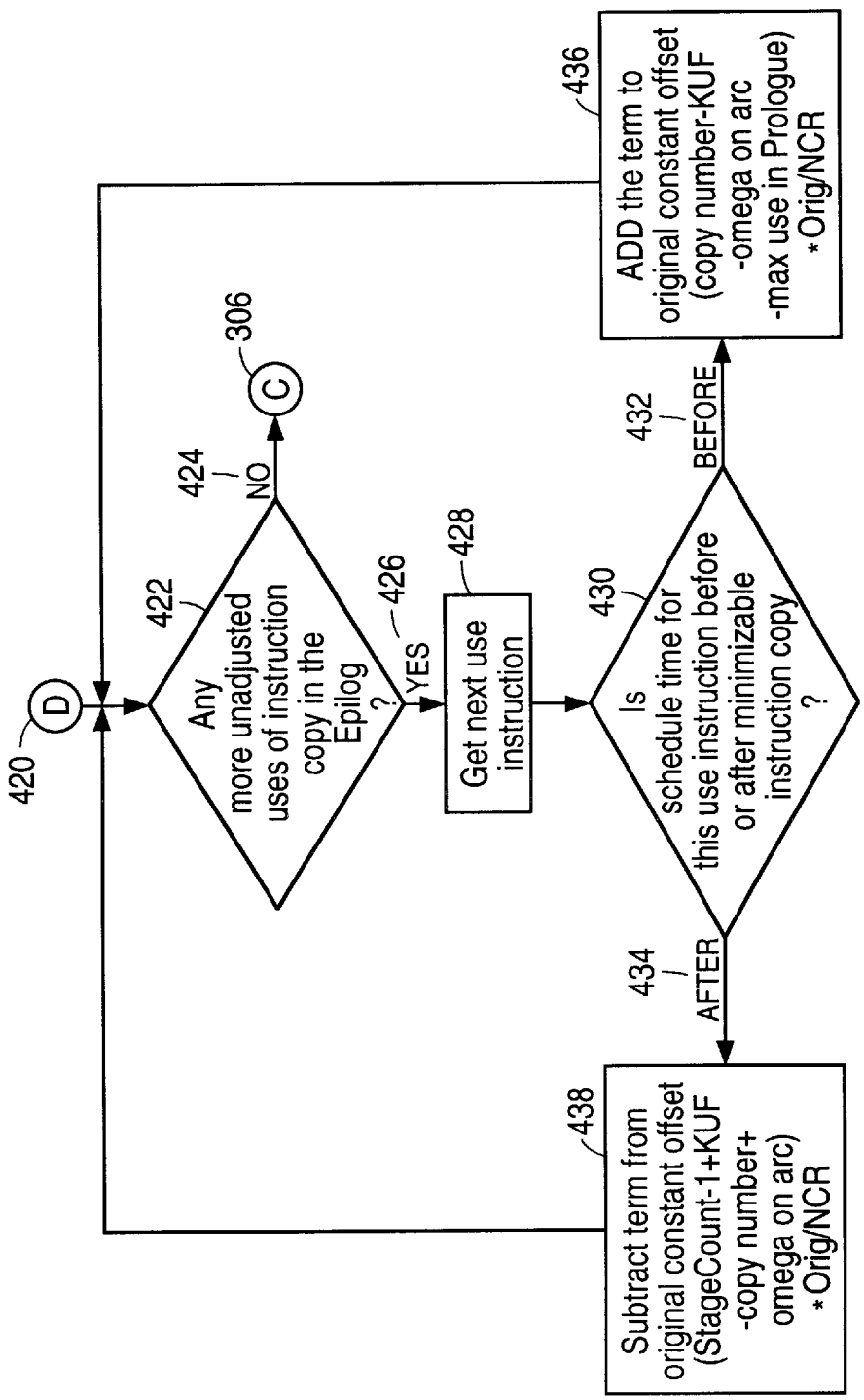
Figure 11:
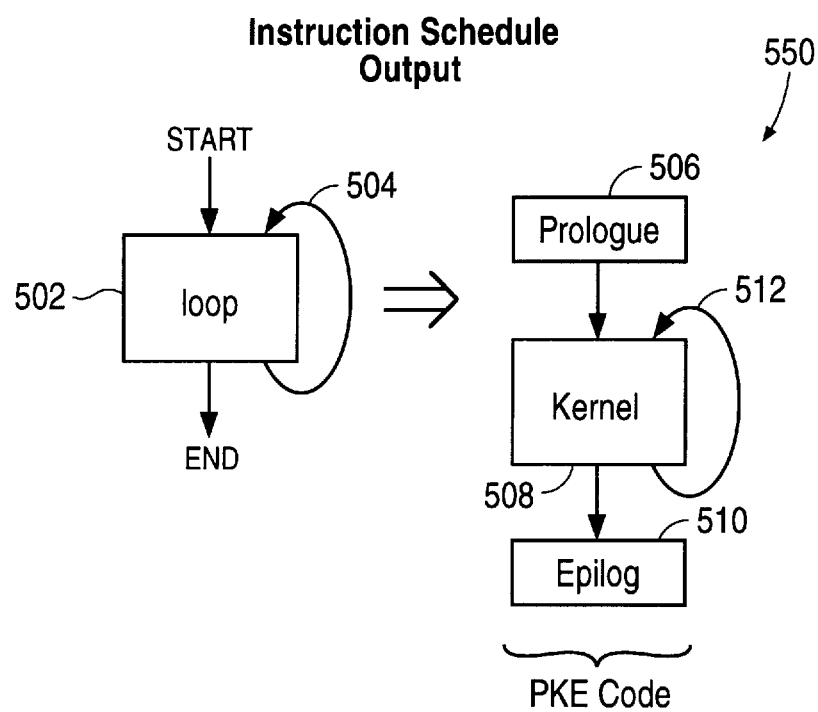
FIG. 11 illustrates the relationship between a program loop and the associated PKE code.

Referring now to FIG. 7 the procedure for identifying reducible instructions in the preferred embodiment is depicted 200. (This description covers in more detail the step identified above as block 156 in FIG. 6). On entry to the block 202, if there are no instructions to be tested 204, 206 the step is completed 208. If there are instructions to be tested 210 the next instruction in the DDG is obtained 212. If the instruction is not an integral self-increment or self-decrement of an induction variable 216 it is considered non-reducible and the routine returns to block 204 via block B 234. If the instruction is an integral self-increment or self-decrement of an induction variable 218 the instruction is tested to see if the induction variable is incremented or decremented by a compile-time known integer constant 220. If not 222 this instruction does not qualify as reducible and the routine returns to block 204. If the instruction does pass this test 224 a test is made to determine if all uses of this instruction can be modified to have an immediate displacement representing the computed result of the instruction 226. If so 230 this instruction is tagged as a reducible instruction 232 and the routine returns to block 204 via block B 234. If not 228, then it is tested to see if the instruction is the loop exit or loop back branch instruction 238. If so 240, this instruction is tagged as a reducible instruction 232 and the routine returns to block 204 via block B 234. If not 242 the instruction is deemed to be non-reducible and the routine returns to block 204. After all instructions (nodes) in the DDG for the loop have been checked, any reducible loop-overhead instructions have been tagged and will not be modulo scheduled with the non-reducible ones but rather will be inserted into the schedule as described in more detail as follows. It should be realized by those skilled in the art, that while this specific test criteria for identifying reducible instructions is used in the preferred embodiment, various other criteria for identifying reducible instructions may be used and should be considered to be within the bounds of the invention claimed herein.

The Preferred Embodiment in Further Detail

The following describes the preferred embodiment in additional detail. After partitioning the instructions into a reducible set and a non-reducible set (call this Step 1), the following steps are performed.

Step 2 Compute the resource requirements for the reducible instructions

For each resource in the machine model compute the total number of time units for which that resource is used by the reducible instructions. For example, if there are 6 reducible address add instructions and each of them uses the adder resource for two time units, then the total resource requirement for this resource is 12.

Step 3 Compute the resource requirements for the non-reducible instructions

Perform the above step for the non-reducible instructions.

Step 4 Compute the value "mii without"

Modulo scheduling attempts to execute loop iterations at the fastest possible rate. Before a schedule is attempted, an upper bound (aggressive estimate) on this rate calculated (designated "mii"). The scheduler attempts to achieve this target rate; if it fails, the goal is relaxed and a new schedule is attempted.

In this step, such a target is computed ignoring the reducible instructions (designated "mii_without"). For example, if there are 6 non-reducible multiply instructions in a loop and the machine can execute at most 2 multiplies in one time unit, then each loop iteration will take at least mii_without=3 time units. Using the resource requirements for the non-reducible instructions and knowing the number of copies available of each resource, this target can be calculated by taking the maximum over all resources of the ratio of the resource requirements to the resource copies.

Step 5 Conditionally increment mii_without

If the value of mii_without computed above is such that there exists an identified reducible instruction requiring a resource all copies of which are entirely consumed by non-reducible instructions, then increase mii_without by 1. This must be done because if it were not, and if the loop were scheduled at the rate computed in step 4, then there would be no room available for the reducible instructions. Note that this is not the same as accommodating the reducible instructions in step 4. In fact, it is because the instructions are reducible that an increment by 1 times, each reducible instruction can be placed once in the unrolled kernel. For many loops, this increment of mii_without may not be required as there may already be enough space to accommodate the reducible instructions.

Step 6 Obtain the value for "mii" taking both resource and recurrence constraints Find the upper bound on the throughput achievable by obtaining the maximum of the mii_without and the rmii (obtained by considering the longest recurrence cyc times, each reducible instruction can be placed once in the unrolled kernel. For many loops, this increment of mii_without may not be required as there may already be enough space to accommodate the reducible instructions.

Step 6 Obtain the value for "mii" taking both resource and recurrence constraints Find the upper bound on the throughput achievable by obtaining the maximum of the mii_without and the rmii (obtained by considering the longest recurrence cycle in the loop graph). This value is used in the next step wherein modulo scheduling of the non-reducible instructions attempts to attain a throughput as close to this maximum value as possible.

Step 7 Derive a Modulo schedule for the non-reducible instructions

In this step, a modulo schedule is derived for the non-reducible instructions of the loop. Let the derived schedule correspond to an execution rate of one iteration every II clock cycles.

Step 8 Compute MKUF (Minimum Kernel Unroll Factor) to Accommodate the Reducible Instructions In this step, a lower bound is calculated for the "kernel unroll factor" (kuf). This invention is aggressive in scheduling just the non-reducible instructions. After they have been scheduled, room must be made for the reducible instructions. The number of existing empty slots in the schedule derived for the non-reducible instructions and the number of slots required for the reducible instructions together determine the minimum value imposed on "kuf." For example, if the reducible instructions require 6 slots of a resource and two empty slots are available in one copy of the kernel after the non-reducible instructions have been scheduled, then the kernel must be unrolled at least three times (three copies of the kernel are needed) to accommodate the reducible instructions. The value must be calculated for each resource used by some reducible instruction and the maximum value chosen. Computationally, $$mkuf = MAX(([r_i/n_i], 0))$$

where i denotes a resource, $r_i$ is the number of copies of this resource used by the reducible instructions, $n_i$ is the number of copies of this resource available in one copy of the kernel after the non-reducible instructions have been scheduled and the "max" is taken over all resources i such that $r_i$ is greater than 0. After the lower bound, "mkuf", is determined, the "kuf" is set to be the maximum of itself and this bound. That is, kuf=Max((kuf, mkuf))

Step 9 Generate Code and insert the reducible instructions in the schedule

Now the prologue/Kernel/Epilogue (PKE) code for the loop is derived by repeating the modulo schedule obtained for the non-reducible instructions every II cycles for a total of N times, where N=stagecount—1+KUF StageCount in this formula is defined in the prior art, and, refers to the number of conceptual stages in the software pipeline of the modulo scheduled loop.

The Prologue and the Epilogue regions represent the fill and the drain regions of the pipeline respectively. The Kernel is the steady state region of the pipeline where iteration is performed. Scheduling of each reducible instruction is performed as follows in the preferred embodiment using the SC 4.0 compiler:

1) Find "MaxUseInPrologue" as follows: Let the result computed by a reducible instruction be used by some other instructions, say, $I_1, I_2, I_3, \ldots I_k$. Let $C_1, C_2, \ldots C_k$ be the number of copies of $I_1, I_2, I_3, \ldots I_k$ respectively placed in the prolog. Then MaxUseInPrologue=max($C_1, C_2, ., C_k$)

2) Place the reducible instruction in the kernel and adjust the displacements on its uses:

Find the first available slot in the kernel, Ti, counting from the end of the kernel, and schedule the instruction. Change the increment on the instruction to be "OriginalIncrement*KUF".

For the uses scheduled before Ti replace the original displacements by adding the following term:

(CopyNumberOfNodeInKernel−Omega+ TotalCopiesOfNodeinPrologue−MaxUseInPrologue)− *OriginalDisplacement.

For the uses scheduled after Ti replace the original displacements by subtracting the term: (KUF− CopyNumberOfNodeInKernel+Omega+ MaxUseinPrologue−TotalCopiesOfNodeInPrologue) *OriginalDisplacement.

where "CopyNumberOfNodeInKernel" ranges from 1 to Kernel Unroll Factor (kuf),

"Omega" is the dependence distance on the arc from the reducible instruction to the use, "TotalCopiesOfNodeInPrologue" is the total number of copies (if any) of this use placed in the Prologue, and "OriginalDisplacement" is the original displacement on the use.

3) For each reducible instruction that has at least one use in the Prologue, place a copy of the instruction in the prologue and adjust displacements as follows:

Find the first available slot in the prologue, Ti, and schedule the instruction. If there is no space available in the Prologue, simply prepend the instruction to the Prologue.

For the uses in prologue scheduled before Ti replace the original displacements by adding the following term: (CopyNumberOfNodeInPrologue−Omega) *OriginalDisplacement For the uses scheduled after Ti replace the original displacements by subtracting the term: (Omega+ MaxUseInPrologue−CopyNumberOfNodeInPrologue) *OriginalDisplacement 4) For each reducible instruction that has at least one use in the Epilogue, place a copy of the instruction in the prologue and adjust displacements as follows:

Find the first available slot in the epilogue, Ti, and schedule the instruction. If there are no empty slots available, append it to the epilogue. Set Ti=(StageCount− 1+KUF)*II+1.

For the uses in epilogue scheduled before Ti replace the original displacements by adding the following term:

(CopyNumberOfNodeInEpilogue−Omega+ TotalCopiesOfNodeInPrologue−MaxUseInPrologue) *OriginalDisplacement.

For the uses in epilogue scheduled after Ti, replace the original displacements by subtracting the term:

(StageCount−1−CopyNumberOfNodeInEpilogue+ Omega TotalCopiesOfNodeInPrologue) *OriginalDisplacement.

The following simple example illustrates the key points described above. The details of the scheduling process, the reservation tables and the final adjustments to the instructions and code are not described in this example but merely the key concepts. Consider a simple machine that is capable of issuing up to two instructions per clock cycle, one memory and one or two computational instructions, in each clock cycle. Now consider a loop containing the following instructions that is to be scheduled for this machine. Assume further that the loop has been examined and that the instructions marked with an asterisk have been recognized as reducible (Step 1).

load
fmul
load
fadd
store
add*
add*
add*
cmp*
ble*

The first partition, non-reducible instructions, require 3 memory and 2 computational slots. The second partition, reducible instructions, require 5 computational slots.

Examining the first partition indicates that three clocks are required to issue the instructions in this partition (see Table 1 below). This is so because there are three memory instructions and only one can be issued in a clock cycle. That is, mii_without=3.

Now examining the resource requirements of the reducible instructions and the empty slot availability in Table 1 shows that one empty slot is available for the reducible instructions. Therefore, mii_without need not be incremented (Step 5).

TABLE 1

| Table of non-reducible instructions | |
|---|---|
| load | fmul |
| load | fadd |
| store | EMPTY |

The loop is then modulo scheduled with mii_without=3 (Step 6). For the sake of simplicity, assume that the result of this schedule is represented just the same as in Table 1.

Now compute the mkuf for the loop as follows: Since there is only one empty slot in one copy of the kernel, and there are five reducible instructions to be placed, the kernel must be unrolled at least five times i.e., mkuf=5. Assume that after this bound is placed on kuf, the value of kuf is 5. In the final step, the reducible operations are placed into the empty slots of the five copies of the kernel and the displacements etc. are adjusted suitably to preserve program correctness. When the kernel is unrolled, a cleanup loop is required to execute the remainder iterations. Such issues are not discussed here because they are general and do not pertain specifically to the invention described here.

Additional Considerations

While the above describes the presently preferred embodiment, those skilled in the art will recognize that there are available other variations of the process for reducing the scheduling of loop-overhead or similar instructions. For example, the process of adjusting the values in the non-reducible instructions used in the preferred embodiment and described above may be described more generally as follows:

Assume that the first load (copy 1) is of the form:

ld[A]

and it's stride is s. Then we know that the i'th load should be of the form:

ld[A+(i-1)*s]

(That is, the sequence of load addresses should be of the form: A, A+s, A+2s, . . . ). Now if we place a reducible instruction of the form:

add A,d,A after the j'th copy of a load, then we can adjust the displacements as follows:

for copies 1 through j of the load, no adjustment is required for copies j+1 through last (SC−1+KUF) we simply subtract d from the displacement For example:

```
ld[A]
ld[A + s]
ld[A + 2*s]
. . .
ld [A + (j − 1)*s]
    <---- Reducible instruction "add A,d,A" is say placed here
ld [A + j*s]
ld [A + (j + 1)*s]
. . .
ld [A + k*s]
```

When the reducible instruction is placed as shown above, the displacements are adjusted as follows:

```
ld[A]
ld[A + s]
ld[A + 2*s]
. . .
ld [A + (j − 1)*s]
add A,d,A
ld [A + j*s − d]
ld [A + (j + 1)*s − d]
. . .
ld [A + k*s − d]
```

The above step can be done more than once as one places multiple copies of the reducible instructions in the prologue, kernel and epilogue.

Similarly, an alternative embodiment of the invention could include the following steps or other variations thereof:

1. Partition the nodes (instructions) into reducible and non-reducible as in the preferred embodiment above.

2. Do not bother to compute values for mkuf due to the reducible instructions or increase mii__without for the same reason, prior to scheduling.

3. Schedule the non-reducible instructions as in the preferred embodiment and place a branch slot in the last group of instructions scheduled.

4. Scan the resulting schedule and look for empty slots available for inserting reducible instructions if required.

5. If there are reducible slots available, at this time compute the mkuf and then generate the schedule with the potentially increased kuf and then insert the reducible instructions.

6. If there are no reducible slots available (which should not happen if the branch slot is placed early in the schedule) then the original schedule can be discarded and the reducible instructions are placed in between some groups of non-reducible instructions.

This variation or the invention has the potential to reduce the trouble required to place the reducible instructions properly and to reduce the effective iteration Interval (II).

It will be appreciated by those skilled in the art that various modifications and alterations may be made in the preferred embodiment disclosed herein without departing from the scope of the invention. Accordingly, the scope of the invention is not to be limited to the particular invention embodiments discussed above, but should be defined only by the claims set forth below and equivalents thereof.

What is claimed is:

1. A computer system having a central processing unit (CPU) and random access memory (RAM) coupled to said CPU, for use in compiling a target program to run on a target computer architecture having a plurality of parallel computation units which facilitate instruction pipelining and which provides an ability to add two values to form an address used in a memory load or store instruction and which permits two or more instructions to be issued in a single clock cycle, said computer system comprising:

a compiler system resident in said computer system having a front end compiler, a code optimizer and a back end code generator; and an instruction partition mechanism coupled to said code optimizer configured to partition instructions for the target program into reducible instructions and non-reducible instructions;

a modulo scheduler mechanism coupled to said code optimizer configured to modulo schedule said non-reducible instructions;

an instruction insertion mechanism configured to directly insert a copy of one of said reducible instructions into a modulo schedule of said non-reducible instructions which is produced by said modulo scheduler mechanism; and an instruction modification mechanism coupled to said code optimizer configured to identify one or more of scheduled non-reducible instructions which would normally use a value produced by a designated reducible instruction and said instruction modification mechanism further configured to modify an original offset in an address portion of said identified one or more of scheduled non-reducible instructions which use a designated reducible instruction.

2. The computer system of claim 1 wherein the modulo scheduler mechanism coupled to said code optimizer configured to modulo schedule said non-reducible instructions is further configured to produce a modulo schedule having a prologue section, a kernel section and an epilogue section.

3. The computer system of claim 1 wherein the instruction insertion mechanism configured to directly insert said copy of said reducible instructions into a modulo schedule of said non-reducible instructions which is produced by said modulo scheduler mechanism will insert no more than three copies of a designated reducible instruction into said modulo scheduled reducible instructions.

4. The computer system of claim 2 wherein the instruction insertion mechanism configured to directly insert said copy of said reducible instructions into a modulo schedule of said non-reducible instructions which is produced by said modulo scheduler mechanism will insert no more than one copy of a designated reducible instruction into each said modulo scheduled prologue, kernel and epilogue sections.

5. An apparatus for optimizing the execution time of executable instructions in a target program which is designated to run on a target computer architecture having a plurality of parallel computation units which facilitate instruction pipelining and which provides an ability to add two values to form an address used in a memory load or store instruction and which permits two or more instructions to be issued in a single clock cycle, said apparatus comprising:

a computer having a processor, a memory, and an input/output section;

a compiler system resident in said computer memory having a front end compiler, a code optimizer and a back end code generator; and an instruction partition mechanism coupled to said computer for use by said code optimizer to partition instructions for the target program into reducible instructions and non-reducible instructions;

a modulo scheduler mechanism coupled to said computer for use by said code optimizer to modulo schedule said non-reducible instructions;

an instruction insertion mechanism configured to directly insert said reducible instructions into a modulo schedule of said non-reducible instructions which is produced by said modulo scheduler mechanism; and an instruction modification mechanism coupled to said computer for use by said code optimizer configured to identify one or more of scheduled non-reducible instructions which would normally use a value produced by a designated reducible instruction and said instruction modification mechanism further configured to modify an original offset in an address portion of said identified one or more of scheduled non-reducible instructions which use a designated reducible instruction.

6. A code optimizer for use in an compiler system for compiling a target program to run on a target computer architecture having a plurality of parallel computation units which facilitate instruction pipelining and which provides an ability to add two values to form an address used in a memory load or store instruction and which permits two or more instructions to be issued in a single clock cycle, said code optimizer comprising:

a first portion configured to accept as input an intermediate code representation of said target program;

a second portion, coupled to said first portion, configured to partition instructions for the target program into reducible instructions and non-reducible instructions;

a third portion, coupled to said second portion configured to modulo schedule said non-reducible instructions;

a fourth portion, coupled to said third portion configured to directly insert copies of said reducible instructions into a modulo schedule of said non-reducible instructions which is produced by said third portion; and a fifth portion, coupled to said fourth portion configured to identify one or more of scheduled non-reducible instructions which would normally use a value produced by a designated reducible instruction and said fifth portion further configured to modify an original offset in an address portion of said identified one or more of scheduled non-reducible instructions which use a designated reducible instruction, thereby producing a schedule of the executable instructions for the target program.

7. A computer controlled method of scheduling the executable instructions of a target program directed at a target computer architecture having a plurality of parallel computation units which facilitate instruction pipelining and which provides an ability to add two values to form an address used in a memory load or store instruction and which permits two or more instructions to be issued in a single clock cycle, the schedule produced in a manner that reduces the number of executable instructions required in the schedule, said method comprising the steps of:

partitioning target program instructions to be compiled into a set of reducible instructions and a set of non-reducible instructions;

modulo scheduling the set of non-reducible instructions;

directly inserting a copy of each reducible instruction into a schedule of the non-reducible instructions;

for a copy of a designated reducible instruction inserted into the schedule, identifying all scheduled non-reducible instructions which use the designated reducible instruction; and modifying the original offset value of the address identifier of an identified non-reducible instruction which uses a designated reducible instruction, thereby producing a schedule of executable instructions for the target program which contains a minimum number of copies of each reducible instruction.

8. The method of claim 7 wherein the step of directly inserting a copy of each reducible instruction into a schedule of the non-reducible instructions inserts at most one copy of the reducible instruction in each of the prologue, kernel and epilogue sections of the schedule.

9. The method of claim 8 wherein the step of directly inserting a copy of each reducible instruction into a schedule of the non-reducible instructions is performed by finding a vacant slot in the schedule, inserting the copy of the reducible instruction in the vacant slot, and setting the displacement of the copy to a new value which corresponds to a function of the original increment in the reducible instruction and the location of the copy in the schedule.

10. The method of claim 9 wherein the displacement of the copy is set to a new value which is equal to the value MaxUseInPrologue times OriginalDisplacement if the copy is located in the prologue of the schedule.

11. The method of claim 9 wherein the displacement of the copy is set to a new value which is equal to the value "KUF times OriginalDisplacement" if the copy is located in the kernel of the schedule.

12. The method of claim 9 wherein the displacement of the copy is set to a new value which is equal to the value "(StageCount−1−MaxUseInPrologue) times OriginalDisplacement" if the copy is located in the epilogue of the schedule.

13. The method of claim 7 wherein the step of modifying the original offset value of the address identifier of an identified non-reducible instruction which uses a designated reducible instruction, further comprises the steps of;

determining which section of the schedule the using non-reducible instruction is in, the sections designated as the prologue, kernel and epilogue sections of the schedule;

determining whether the copy of the reducible instruction which is used by the identified non-reducible instruction is placed in the schedule before or after the using non-reducible instruction; and adjusting the original offset value in the using non-reducible instruction by a value which is a function of the section of the schedule the using non-reducible instruction is in, and whether the using non-reducible instruction is located before or after a copy of the reducible instruction in the schedule.

14. A computer program product comprising:

a computer usable medium having computer readable program code mechanisms embodied therein to schedule the executable instructions of a target program directed at a target computer architecture having a plurality of parallel computation units which facilitate instruction pipelining and which provides an ability to add two values to form an address used in a memory load or store instruction and which permits two or more instructions to be issued in a single clock cycle, the schedule produced in a manner that reduces the number of executable instructions required in the schedule, the computer readable program code mechanisms in said computer program product comprising:

computer readable code mechanisms to cause a computer to partition instructions for a loop in the target program into reducible instructions and non-reducible instructions;

computer readable code mechanisms to cause the computer to modulo schedule said non-reducible instructions; and computer readable code mechanisms to cause the computer to directly insert said reducible instructions into a modulo schedule of said non-reducible instructions which is produced by said modulo scheduler mechanism; and computer readable code mechanisms to cause the computer to identify one or more of scheduled non-reducible instructions which would normally use a value produced by a designated reducible instruction and said instruction modification mechanism further to modify an original offset in an address portion of said identified one or more of scheduled non-reducible instructions which use a designated reducible instruction.

15. The computer system of claim 1 wherein a reducible instruction is defined as an instruction which is an integral self-increment or self-decrement of an induction variable, wherein the induction variable is incremented and decremented by a compile-time known integer constant and wherein all uses of said instruction can be modified to have an immediate displacement representing the computed result of the reducible instruction.

16. The apparatus of claim 5 wherein a reducible instruction is defined as an instruction which is an integral self-increment or self-decrement of an induction variable, wherein the induction variable is incremented and decremented by a compile-time known integer constant and wherein all uses of said instruction can be modified to have an immediate displacement representing the computed result of the reducible instruction.

17. The code optimizer of claim 6 wherein a reducible instruction is defined as an instruction which is an integral self-increment or self-decrement of an induction variable, wherein the induction variable is incremented and decremented by a compile-time known integer constant and wherein all uses of said instruction can be modified to have an immediate displacement representing the computed result of the reducible instruction.

18. The method of claim 7 wherein a reducible instruction is defined as an instruction which is an integral self-increment or self-decrement of an induction variable, wherein the induction variable is incremented and decremented by a compile-time known integer constant and wherein all uses of said instruction can be modified to have an immediate displacement representing the computed result of the reducible instruction.

19. The computer program product of claim 14 wherein a reducible instruction is defined as an instruction which is an integral self-increment or self-decrement of an induction variable, wherein the induction variable is incremented and decremented by a compile-time known integer constant and wherein all uses of said instruction can be modified to have an immediate displacement representing the computed result of the reducible instruction.

* * * * *